(12) United States Patent
Park

(10) Patent No.: US 8,321,128 B2
(45) Date of Patent: Nov. 27, 2012

(54) METHOD FOR CORRECTING MAP MATCHING AND NAVIGATION SYSTEM IMPLEMENTING THE METHOD

(75) Inventor: Sa Da Park, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 422 days.

(21) Appl. No.: 12/599,959

(22) PCT Filed: Jun. 25, 2007

(86) PCT No.: PCT/KR2007/003055
§ 371 (c)(1),
(2), (4) Date: Nov. 12, 2009

(87) PCT Pub. No.: WO2008/140144
PCT Pub. Date: Nov. 20, 2008

(65) Prior Publication Data
US 2010/0241355 A1    Sep. 23, 2010

(30) Foreign Application Priority Data
May 14, 2007 (KR) .......... 10-2007-0046762

(51) Int. Cl.
*G01C 21/36* (2006.01)
(52) U.S. Cl. ........ 701/446; 701/408; 701/410; 701/412; 701/468; 701/469; 340/995.28
(58) Field of Classification Search ........... 701/446, 701/408–412, 445, 448, 468–469, 472, 500–501; 340/995.28
See application file for complete search history.

(56) References Cited

U.S. PATENT DOCUMENTS

| | | | | |
|---|---|---|---|---|
| 4,393,709 A * | 7/1983 | Harumatsu et al. | ......... | 73/504.12 |
| 5,862,511 A * | 1/1999 | Croyle et al. | ................. | 701/445 |
| 5,935,191 A * | 8/1999 | Sakanashi et al. | ........... | 701/500 |
| 6,115,668 A * | 9/2000 | Kaneko et al. | ................ | 701/454 |
| 6,282,496 B1* | 8/2001 | Chowdhary | ................. | 701/446 |
| 6,308,134 B1* | 10/2001 | Croyle et al. | ................ | 701/472 |
| 6,317,683 B1* | 11/2001 | Ciprian et al. | ................ | 701/118 |
| 6,430,501 B1* | 8/2002 | Slominski | ..................... | 701/429 |
| 6,626,797 B2* | 9/2003 | Shiiba et al. | .................... | 477/97 |
| 6,631,321 B1* | 10/2003 | Ciprian | ........................ | 701/469 |
| 6,640,188 B2* | 10/2003 | Hashida | ....................... | 701/446 |
| 6,856,895 B2* | 2/2005 | Hashida | ....................... | 701/446 |
| 6,865,485 B2* | 3/2005 | Jun | .............................. | 701/409 |
| 7,113,866 B2* | 9/2006 | Taliwal | ......................... | 701/410 |

(Continued)

FOREIGN PATENT DOCUMENTS
CN          100513224 C        4/2007
(Continued)

OTHER PUBLICATIONS

International Search Report mailed Feb. 14, 2008 for international Application No. PCT/KR2007/003055.

(Continued)

*Primary Examiner* — Joseph Rocca
*Assistant Examiner* — James English
(74) *Attorney, Agent, or Firm* — Saliwanchik, Lloyd & Eisenschenk

(57) ABSTRACT

A method of correcting a map matching and a navigation system for implementing the method are provided. The method includes: determining whether a vehicle turns by using an acceleration sensor; and performing a map matching correction by using the determination of whether the vehicle turns and Global Positioning System (GPS) information.

10 Claims, 6 Drawing Sheets

U.S. PATENT DOCUMENTS

| | | | |
|---|---|---|---|
| 7,353,112 B2 * | 4/2008 | Choi et al. | 701/504 |
| 7,359,776 B2 * | 4/2008 | Souda | 701/29.7 |
| 7,548,813 B2 * | 6/2009 | Komatsu | 701/448 |
| 7,657,395 B2 * | 2/2010 | Katsumoto | 702/141 |
| 7,711,483 B2 * | 5/2010 | Colley | 701/472 |
| 7,747,383 B2 * | 6/2010 | Ohkubo et al. | 701/504 |
| 2002/0022924 A1 | 2/2002 | Begin | |
| 2004/0204798 A1 * | 10/2004 | Imada et al. | 701/1 |
| 2008/0243384 A1 * | 10/2008 | Ohkubo et al. | 701/220 |
| 2010/0125413 A1 * | 5/2010 | Wang | 701/213 |
| 2010/0222956 A1 * | 9/2010 | Lee et al. | 701/29 |

FOREIGN PATENT DOCUMENTS

| | | |
|---|---|---|
| CN | 1961197 B | 1/2011 |
| EP | 1745974 A1 | 1/2007 |
| JP | 05312933 | 11/1993 |
| KR | 1020030033853 | 5/2003 |
| KR | 1020040033181 | 4/2004 |
| KR | 1020050049071 | 5/2005 |
| KR | 1020060018311 | 3/2006 |

OTHER PUBLICATIONS

Office Action dated Sep. 24, 2010 in Australian Application No. 2007353181, filed Jun. 25, 2007.

Office Action dated Sep. 6, 2011 in Chinese Application No. 200780053787.6, filed Jun. 25, 2007.

* cited by examiner

METHOD FOR CORRECTING MAP MATCHING AND NAVIGATION SYSTEM IMPLEMENTING THE METHOD

FIELD OF THE DISCLOSURE

The present disclosure relates to a method of correcting a map matching and a navigation system for implementing the method of correcting the map matching.

BACKGROUND OF THE DISCLOSURE

Generally, navigation systems are systems to provide navigation information for driving of vehicles, such as cars, using artificial satellites. The navigation systems are referred to as automatic navigation systems.

The navigation systems receive, by using GPS receivers, Global Positioning System (GPS) information from GPS satellites floating above the earth, and calculate locations of the navigation systems themselves based on the received GPS information. The navigation systems may provide various information helpful for driving of vehicles by notifying users of a current vehicle location based on location information of the navigation systems themselves, calculating moving routes to desired destinations, guiding the users according to the moving routes, and the like.

Specifically, the navigation systems receive the GPS information including latitude information and longitude information from the GPS satellites, and calculate and output location information of vehicles. Also, the navigation systems perform a map matching of the outputted location information with map information such as geographical features, roads, buildings, and the like, being disposing according to latitudes and longitudes, and show moving routes from current locations to destinations which the users desire. The navigation systems perform road guidance showing the moving routes to the destinations by using maps on reduced scales fixed on display apparatuses, and notify the users of moving directions at intersections by using images or voices.

Also, the navigation systems cannot accurately perform the road guidance due to errors between the GPS information and the map information when the map matching is performed by using only the GPS information.

As an example, when vehicles turn left/right, the navigation systems may generate errors between actual locations of the vehicles and locations of the vehicles on the navigation systems when the map matching is performed. As another example, when vehicles actually leave moving routes, especially when the vehicles leave the moving routes from similar-angled links, that is, roads, there is a problem that the navigation systems belatedly detect points in time when the vehicles leave the moving routes. As still another example, when vehicles are driven/stopped in areas where the GPS information cannot be received, for example, tunnels, the navigation systems cannot recognize whether the vehicles is driven/stopped in the areas where the GPS information cannot be received.

SUMMARY OF THE DISCLOSURE

The present disclosure provides a method of correcting a map matching and a navigation system for implementing the method which can minimize an error between Global Positioning System (GPS) information and map information by using an acceleration sensor of a vehicle, thereby quickly and accurately performing the map matching.

The present disclosure also provides a method of correcting a map matching and a navigation system for implementing the method which can quickly and accurately perform the map matching in various driving environments by using an acceleration sensor.

Technical goals of the present disclosure are not limited to the above-described technical goals, and other technical goals not described above would be appreciated by those skilled in the art with reference to the following description.

According to an aspect of the present disclosure, there is provided a method of correcting a map matching, the method including: determining whether a vehicle turns by using an acceleration sensor; and performing a map matching correction by using the determination of whether the vehicle turns and Global Positioning System (GPS) information.

According to another aspect of the present disclosure, there is provided a method of correcting a map matching, the method including: checking whether a vehicle leaves a route; determining whether the vehicle enters an uphill/downhill road by using an acceleration sensor when the vehicle leaves the route; and performing a map matching correction by using the determination of whether the vehicle enters the uphill/downhill road and GPS information.

According to still another aspect of the present disclosure, there is provided a method of correcting map matching, the method including: checking whether GPS information can be received; determining whether a vehicle is driven/stopped by using an acceleration sensor when the GPS information cannot be received; and performing a map matching correction by using the determination of whether the vehicle is driven/stopped.

According to an aspect of the present disclosure, there is provided a navigation system including: a turn determination unit determining whether a vehicle turns by using an acceleration sensor; and a map matching correction unit performing a map matching correction by using the determination of whether the vehicle turns and GPS information.

According to another aspect of the present disclosure, there is provided a navigation system including: a road entrance determination unit checking whether a vehicle leaves a route, and determining whether the vehicle enters an uphill/downhill road by using an acceleration sensor when the vehicle leaves the route; and a map matching correction unit performing a map matching correction by using the determination of whether the vehicle enters the uphill/downhill road and GPS information.

According to still another aspect of the present disclosure, there is provided a navigation system including: a drive/stop determination unit checking whether GPS information can be received, and determining whether a vehicle is driven/stopped by using an acceleration sensor when the GPS information cannot be received; and a map matching correction unit performing a map matching correction by using the determination of whether the vehicle is driven/stopped.

Details of other aspects are included in detailed descriptions and accompanying drawings.

Advantages, features, and aspects of the present disclosure will become apparent and more readily appreciated from the following detailed description of exemplary embodiments, taken in conjunction with the accompanying drawings. However, the present disclosure is not limited to the exemplary embodiments described below, and may be realized in various exemplary embodiments. The exemplary embodiments of the present disclosure are provided in order to sufficiently explain the present disclosure, and notify those skilled in the art of the scope of the present disclosure. The scope of the present disclosure is defined by the claims and their equivalents. Like reference numerals refer to the like elements throughout.

DETAILED DESCRIPTION OF EXEMPLARY EMBODIMENTS

Hereinafter, exemplary embodiments of the present disclosure will be described in detail with reference to the attached drawings.

A navigation system of the present disclosure enables a navigator to accurately perform a map matching by using an acceleration sensor. Specifically, the navigation system may accurately and quickly perform the map matching by determining a vehicle turns when the vehicle turns left/right, or determining whether the vehicle enters an uphill/downhill road, or determining whether the vehicle is driven/stopped by using the acceleration sensor. The navigation system may be realized in ordinary navigation systems. Also, the acceleration sensor may be mounted in the navigation system.

Figure 1:
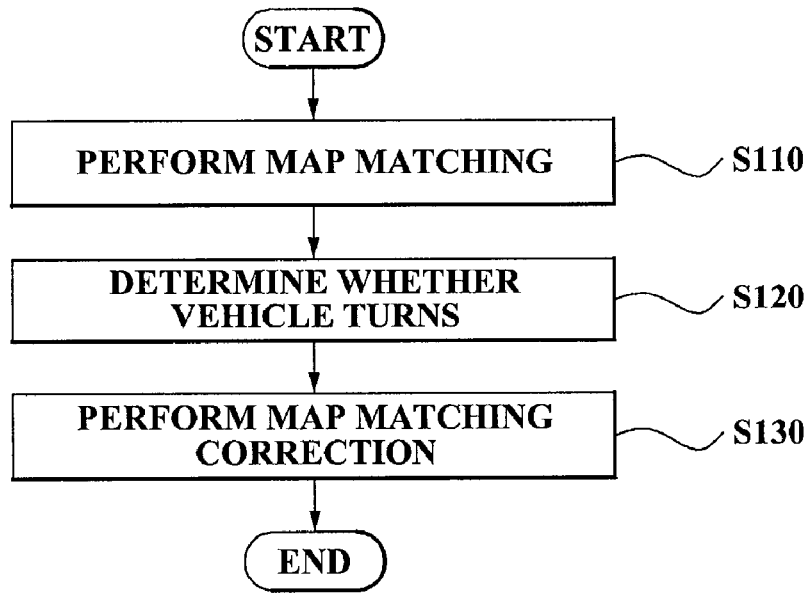
FIG. 1 is a flowchart illustrating a method of correcting a map matching according to an exemplary embodiment of the present disclosure.

FIG. 1 is a flowchart illustrating a method of correcting a map matching according to an exemplary embodiment of the present disclosure.

Referring to FIG. 1, a navigation system may perform a map matching of current vehicle location information with map information by using Global Positioning System (GPS) information and the map information in operation S110. Specifically, the navigation system may interoperate the GPS information and the map information, and correct a vehicle location on the map information when distance information and direction information of actually driving the vehicle are different from an image shown on the map information.

Also, when the vehicle turns left or right at an intersection, and the like, while performing operation S110, an accurate correction cannot be performed due to an error between the GPS information and the map information, and the like, when using the above-described map matching. Accordingly, the navigation system may perform a map matching correction by determining whether the vehicle turns and applying a result of the determination to the map matching in order to perform the accurate correction. This is described in detail below.

The navigation system may interoperate with the map matching, and determine whether the vehicle turns by using an acceleration sensor in operation S120. Specifically, after measuring an inclination of the vehicle by using the acceleration sensor, the navigation system may determine whether the vehicle turns based on the measured inclination.

In this instance, the navigation system may determine that the vehicle turns right when the measured inclination indicates that the vehicle is inclined to a left-hand side. Conversely, the navigation system may determine that the vehicle turns left when the measured inclination indicates that the vehicle is inclined to a right-hand side.

Also, the navigation system may determine whether a GPS angle shows a left/right rotation form. The navigation system may determine that the vehicle does not turn and a lane of the vehicle is changed when the GPS angle shows the left/right rotation form. Specifically, the navigation system may accurately determine whether the vehicle turns by using the acceleration sensor and the GPS angle.

Here, the GPS angle may be realized on a screen of the navigation system when the vehicle is driven, and signify that the map information shows an angle of a left/right rotation by establishing a vehicle driving direction as a standard.

In operation S130, the navigation system may perform a map matching correction by using the determination of whether the vehicle turns and GPS information. Specifically, the navigation system may recognize current location information of the vehicle by using the GPS information when the vehicle turns, and perform the map matching correction by using the recognized location information.

For example, the navigation system may recognize current location information of the vehicle by using the GPS information of the vehicle when it is determined that the vehicle turns right, and perform the map matching correction by using the recognized location information so that the vehicle realized on the screen of the navigation system may immediately turn right. Also, the navigation system may recognize current location information of the vehicle when it is determined that the vehicle turns left, and perform the map matching correction by using the recognized location information so that the vehicle realized on the screen of the navigation system may immediately turn left.

Figure 2:
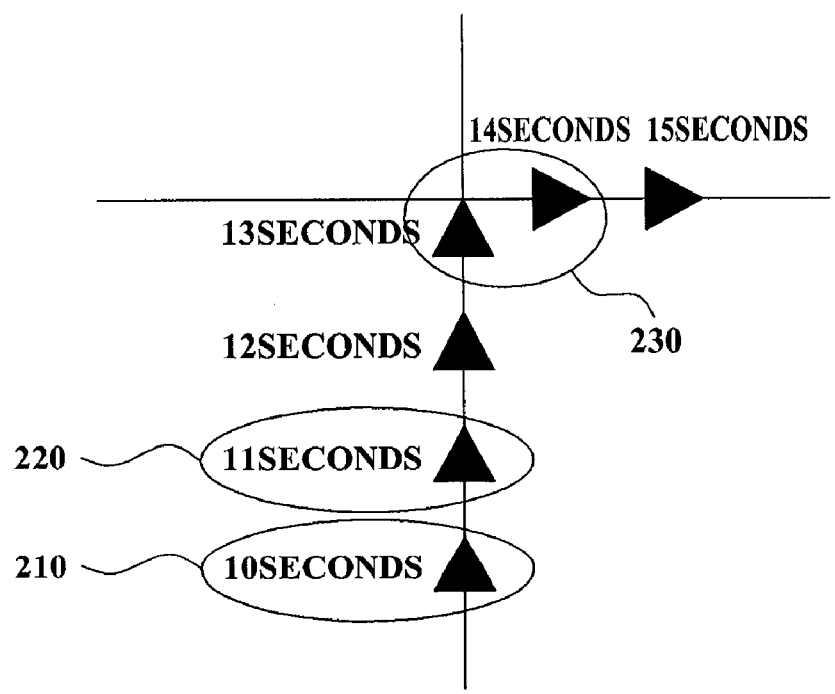
FIG. 2 illustrates an example of correcting a map matching according to an exemplary embodiment of the present disclosure.

FIG. 2 illustrates an example of correcting a map matching according to an exemplary embodiment of the present disclosure.

Referring to FIG. 2, a navigation system performs a map matching in an existing method, and starts to read a value of an acceleration sensor concerning whether a vehicle turns before crossroads. Next, the navigation system recognizes whether the vehicle turns by using the value concerning whether the vehicle turns. Also, when it is determined that the vehicle turns as a result of the recognition, the navigation system immediately turns the vehicle of the navigation system.

In this instance, a point in time when the navigation system determines whether the vehicle turns may be about 10 seconds as illustrated in reference number 210 of FIG. 2. Also, a point in time when the navigation system turns the vehicle of the navigation system may be about 11 seconds by reflecting turn information of the vehicle in the map matching and performing the map matching correction as illustrated in reference number 220. Conversely, a point in time when the navigation system turns the vehicle of the navigation system by using an existing map matching method of not using the acceleration sensor may be about 13 or 14 seconds, 2 or 3 seconds slower than an exemplary embodiment of the present disclosure as illustrated in reference number 230.

The navigation system does not determine whether the vehicle turns by using only the acceleration sensor, and determines whether a GPS angle shows a slight left/right rotation form, thereby improving accuracy of the map matching. Specifically, the navigation system may accurately determine whether the vehicle turns by using the acceleration sensor and the GPS angle. Accordingly, the navigation system may prevent a misjudgment of determining that the vehicle turns when a lane of the vehicle is changed.

As described above, the navigation system according to an exemplary embodiment of the present disclosure may perform the accurate map matching by determining whether the vehicle turns by using the acceleration sensor, and applying a result of the determination to the map matching. Also, the navigation system according to the exemplary embodiment of the present disclosure enables vehicle driving information of the navigation system to quickly react to actual vehicle driving information. Also, the navigation system according to the exemplary embodiment of the present disclosure may accurately determine whether the vehicle turns by using the acceleration sensor and the GPS angle.

Figure 3:
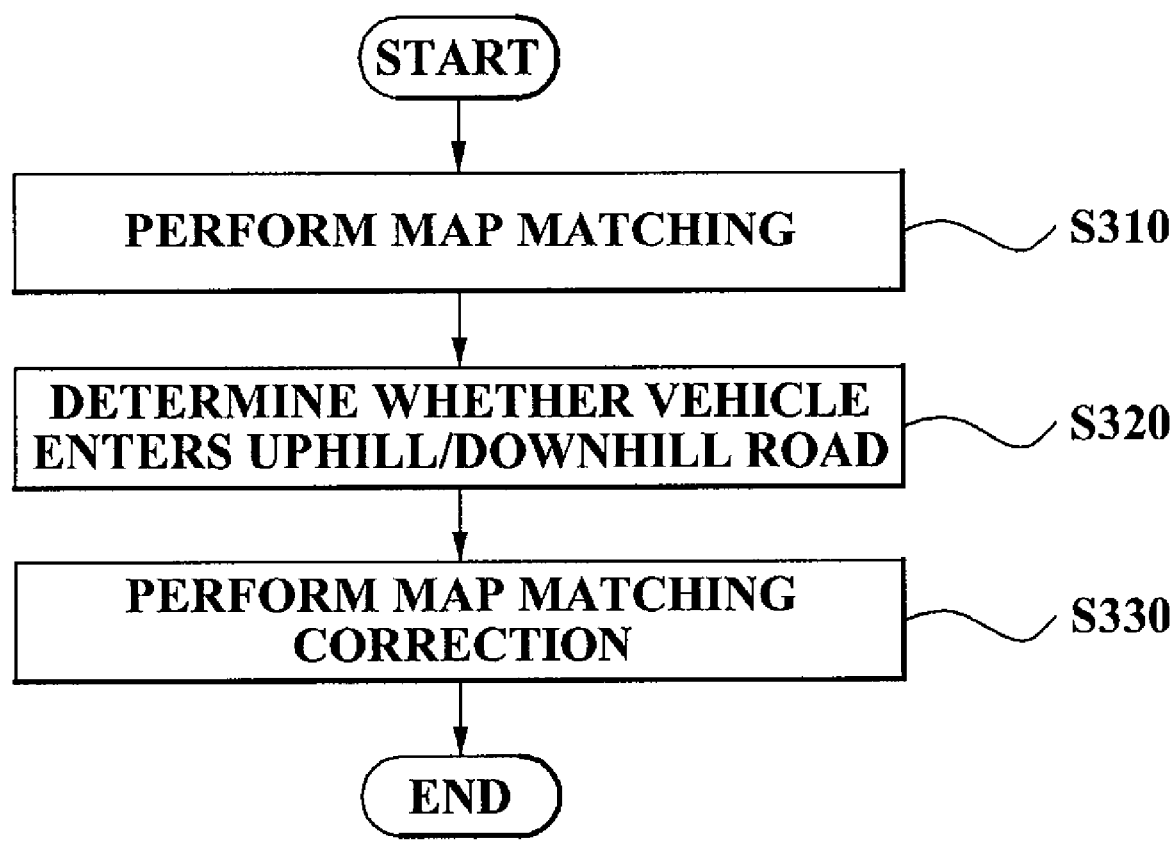
FIG. 3 is a flowchart illustrating a method of correcting a map matching according to another exemplary embodiment of the present disclosure.

FIG. 3 is a flowchart illustrating a method of correcting a map matching according to another exemplary embodiment of the present disclosure.

Referring to FIG. 3, a navigation system may perform a map matching of current vehicle location information with map information by using GPS information and the map information in operation S310. Specifically, the navigation system may interoperate the GPS information and the map information, and correct a vehicle location on the map information when distance information of actual vehicle driving and direction information of actual vehicle driving are different from an image shown on the map information.

Also, when a driver does not follow an original route and drives the vehicle to another route such as an uphill road or a downhill road, for example, an overpass, a ramp, an underpass, and the like, while performing operation S310, an accurate correction cannot be performed by using the above-described map matching. Accordingly, the navigation system may perform a map matching correction by determining whether the vehicle goes up or goes down, and applying a result of the determination to the map matching in order to perform the accurate correction. This is described in detail below.

The navigation system may check whether the vehicle leaves a route. When it is checked that the vehicle leaves the route, the navigation system may interoperate with the map matching, and determine whether the vehicle enters an uphill/downhill road by using an acceleration sensor in operation S320. Specifically, the navigation system may check whether the vehicle leaves the route and enters another route disregarding the driving route currently provided by the navigation system. When the vehicle leaves the route and enters the other route, the navigation system may determine whether the vehicle goes up through the overpass, the entrance ramp, and the like, or goes down through the underpass, the exit ramp, and the like by using an acceleration sensor.

In this instance, the navigation system may measure an inclination of the vehicle by using the acceleration sensor, and determine whether the vehicle enters the uphill/downhill road based on the measured inclination. Specifically, the navigation system may determine that the vehicle enters the uphill road when the measured inclination indicates that the vehicle is inclined to a back side. Conversely, the navigation system may determine that the vehicle enters the downhill road when the measured inclination indicates that the vehicle is inclined to a front side.

In operation S330, the navigation system may perform a map matching correction by using the determination of whether the vehicle enters the uphill/downhill road and GPS information. Specifically, the navigation system may recognize current location information of the vehicle by using the GPS information when the vehicle enters the uphill/downhill road, and perform the map matching correction by using the recognized location information.

For example, a vehicle driver may drive the vehicle to the entrance ramp being an entrance road to an express highway at an express highway interchange disregarding a straight road, that is, a national highway provided by the navigation system. Specifically, the vehicle driver may drive the vehicle leaving an original route. In this case, the navigation system may re-search route information of the vehicle by using the determination of whether the vehicle enters the uphill/downhill road and the GPS information, and perform the map matching correction so that the vehicle realized in the navigation system may enter the entrance ramp according to the re-searched route information.

Figure 4:
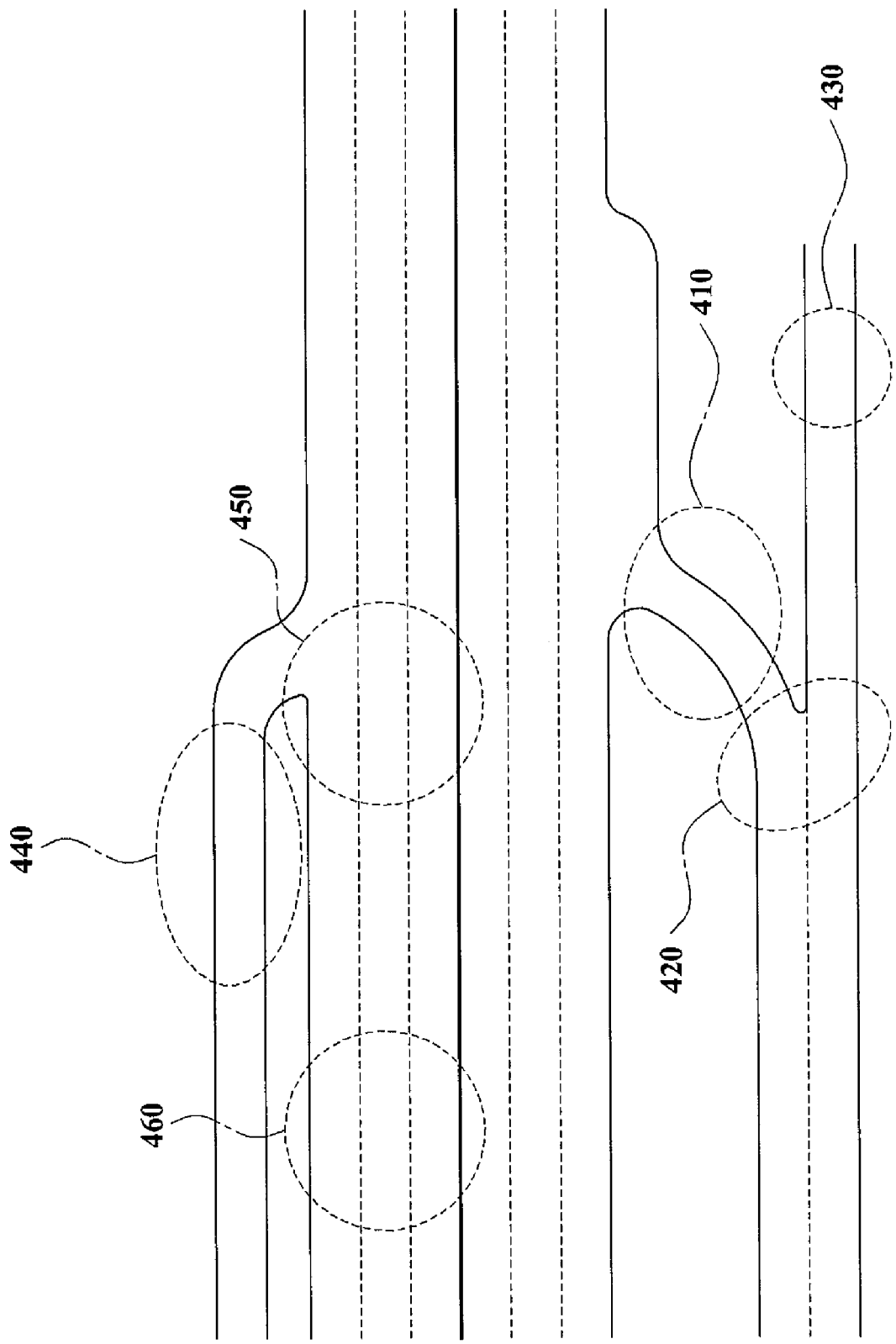
FIG. 4 illustrates an example of correcting a map matching according to another exemplary embodiment of the present disclosure.

FIG. 4 illustrates an example of correcting a map matching according to another exemplary embodiment of the present disclosure.

Referring to FIG. 4, a navigation system performs a map matching in an existing method, and starts to read a value concerning whether a vehicle enters a road by using an acceleration sensor when the vehicle leaves a driving route of the navigation system. Next, the navigation system recognizes whether the vehicle enters an uphill/downhill road by using the value concerning whether the vehicle enters the road. When it is determined that the vehicle enters an uphill road 410 or a downhill road 440 as a result of the recognition, the navigation system enables the vehicle realized in the navigation system to leave the current driving route, and quickly re-searches a corrected route, that is, the actual driving route of the vehicle. Accordingly, the navigation system enables a driver to quickly receive a road guide to the corrected route even when the vehicle leaves the route.

In this instance, a point in time when the navigation system enables the vehicle realized in the navigation system to leave the route may be an approximate point in time when the vehicle passes a forked road divided into an original route, that is, a national highway or an express highway, and a leaving route, that is, an express highway ramp as illustrated in 420 and 450 of FIG. 4. It may be understood that the point in time is earlier than points in time of leaving the route when an existing map matching is performed, that is, 430 and 460. Accordingly, the navigation system may perform the map matching more quickly and accurately than the existing map matching.

Also, the navigation system may also apply the above-described logic, that is, determining whether the vehicle enters the uphill/downhill road by using the acceleration sensor, to a side road of an overpass/underpass, and perform a map matching correction in order to quickly re-search vehicle route information of the navigation system by using actual route information of the vehicle, that is, the uphill/downhill road. Accordingly, the navigation system may quickly and accurately perform a route re-search for the map matching correction when the vehicle leaves the route.

Figure 5:
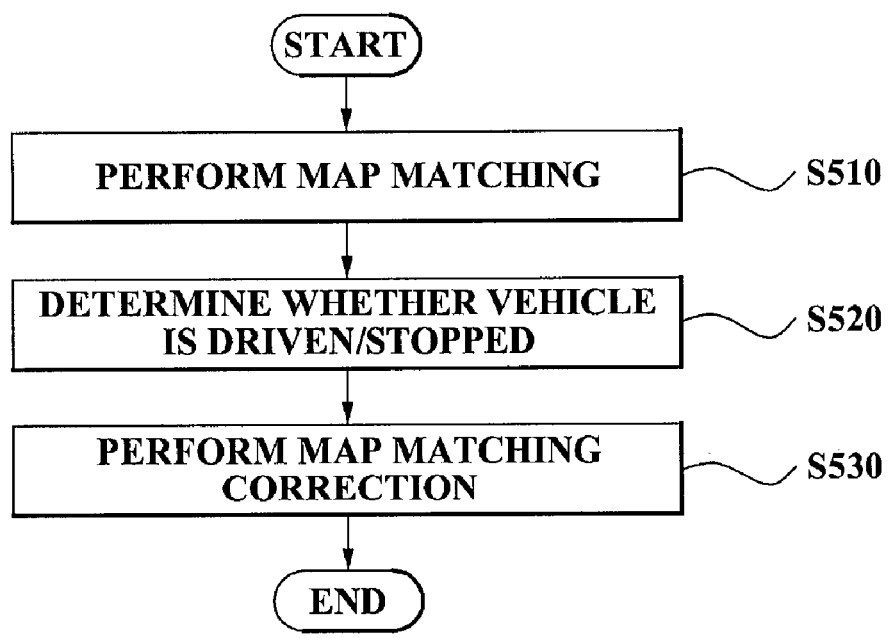
FIG. 5 is a flowchart illustrating a method of correcting a map matching according to still another exemplary embodiment of the present disclosure.

FIG. 5 is a flowchart illustrating a method of correcting a map matching according to still another exemplary embodiment of the present disclosure.

Referring to FIG. 5, a navigation system may perform a map matching of current vehicle location information with map information by using GPS information and the map information in operation S510. Specifically, the navigation system may interoperate the GPS information and the map information, and correct a vehicle location on the map information when distance information of actual vehicle driving and direction information of actual vehicle driving are different from an image shown on the map information.

Also, when a vehicle enters an area where GPS information cannot be received such as tunnel, and the like, while performing operation S510, an accurate correction cannot be performed by using the above-described map matching. For example, when the vehicle is driven again after being momentarily stopped in the tunnel, a map matching correction cannot be accurately performed. Accordingly, the navigation system may perform the map matching correction by determining whether the vehicle is driven/stopped, and applying a result of the determination to the map matching in order to perform the accurate map matching correction. This is described in detail below.

The navigation system may check whether GPS information can be received by the vehicle. When it is checked that the GPS information cannot be received, the navigation system may interoperate with the map matching, and determine whether the vehicle is driven/stopped by using an acceleration sensor in operation S520. Specifically, the navigation system may determine whether the vehicle is driven/stopped by using an output value of the acceleration sensor in the area where the GPS information cannot be received such as a tunnel, and the like.

In this instance, the navigation system may measure speed information of the vehicle by using the acceleration sensor, and determine whether the vehicle is driven/stopped based on the measured speed information. For example, when the measured speed information is 0, the navigation system may determine that the vehicle is stopped. Conversely, when the measured speed information is different from 0, the navigation system may determine that the vehicle is driven.

In operation S530, the navigation system may perform a map matching correction by using the determination of whether the vehicle is driven/stopped. Specifically, the navigation system may perform the map matching correction by using the speed information of the vehicle until the GPS information can be received by the vehicle when the vehicle is driven/stopped.

For example, when the vehicle enters the tunnel, the navigation system may measure speed information of the vehicle at a point in time of entering the tunnel. The navigation system may store the measured speed information in a storage device. In this instance, the navigation system may have the storage device built-in. Next, the navigation system may perform the map matching correction by applying the measured speed information in the area where the GPS information cannot be received such as a tunnel, and the like.

In this instance, when the vehicle is momentarily stopped, the navigation system may maintain a state of applying speed information '0' to the vehicle of realized in the navigation system and stopping the vehicle. When the vehicle is subsequently driven again, the navigation system may perform the map matching correction by extracting the speed information of the vehicle from the storage device and applying the extracted speed information to the vehicle of the navigation system.

Accordingly, the navigation system may accurately perform the map matching correction by using the acceleration sensor in the area where the GPS information cannot be received such as a tunnel, and the like, thereby minimizing a map matching error in the area where the GPS information cannot be received.

Also, although the vehicle is actually stopped in an area where there are many high-rise buildings or under an overpass, it may be shown that the vehicle of the navigation system is driven. Since the navigation system may determine the vehicle is stopped by using the acceleration sensor in the above-described area, that is, in the area where there are many high-rise buildings or under the overpass, a malfunction of the navigation system due to a reflected wave by buildings, and the like, that is, a multipath, may be prevented.

The exemplary embodiments of the present disclosure include computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

Figure 6:
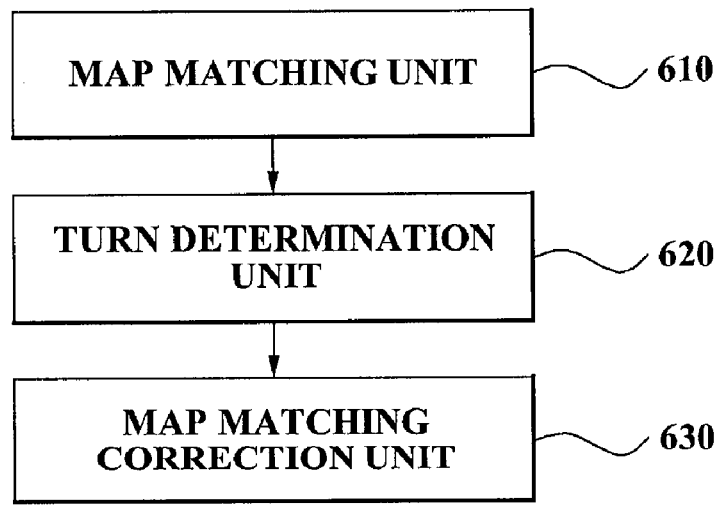
FIG. 6 is a block diagram illustrating a navigation system according to an exemplary embodiment of the present disclosure.

FIG. 6 is a block diagram illustrating a navigation system according to an exemplary embodiment of the present disclosure.

Referring to FIG. 6, the navigation system according to the present exemplary embodiment of the present disclosure may include a map matching unit 610, a turn determination unit 620, and a map matching correction unit 630.

The map matching unit 610 may perform a map matching of current vehicle location information with map information by using GPS information and the map information. Specifically, the map matching unit 610 may interoperate the GPS information and the map information, and correct a vehicle location on the map information when distance information and direction information of actually driving the vehicle are different from an image shown on the map information.

The turn determination unit 620 may interoperate with the map matching, and determine whether the vehicle turns by using an acceleration sensor. Specifically, after measuring an inclination of the vehicle by using the acceleration sensor, the turn determination unit 620 may determine whether the vehicle turns based on the measured inclination.

In this instance, the turn determination unit 620 may determine that the vehicle turns right when the measured inclination indicates that the vehicle is inclined to a left-hand side. Conversely, the turn determination unit 620 may determine that the vehicle turns left when the measured inclination indicates that the vehicle is inclined to a right-hand side.

In this instance, the turn determination unit 620 may determine whether a GPS angle shows a left/right rotation form. The turn determination unit 620 may determine that the vehicle does not turn and a lane of the vehicle is changed when the GPS angle shows the left/right rotation form. Specifically, the turn determination unit 620 may accurately determine whether the vehicle turns by using the acceleration sensor and the GPS angle.

Here, the GPS angle may be realized on a screen of the navigation system when the vehicle is driven, and signify that the map information shows an angle of a left/right rotation by establishing a vehicle driving direction as a standard.

The map matching correction unit 630 may perform a map matching correction by using the determination of whether the vehicle turns and GPS information. Specifically, the map matching correction unit 630 may recognize current location information of the vehicle by using the GPS information when the vehicle turns, and perform the map matching correction by using the recognized location information.

For example, the map matching correction unit 630 may recognize current location information of the vehicle by using the GPS information of the vehicle when it is determined that the vehicle turns right, and perform the map matching correction by using the recognized location information so that the vehicle realized on the screen of the navigation system may immediately turn right. Also, the map matching correction unit 630 may recognize current location information of the vehicle when it is determined that the vehicle turns left, and perform the map matching correction by using the recognized location information so that the vehicle realized on the screen of the navigation system may immediately turn left.

Figure 7:
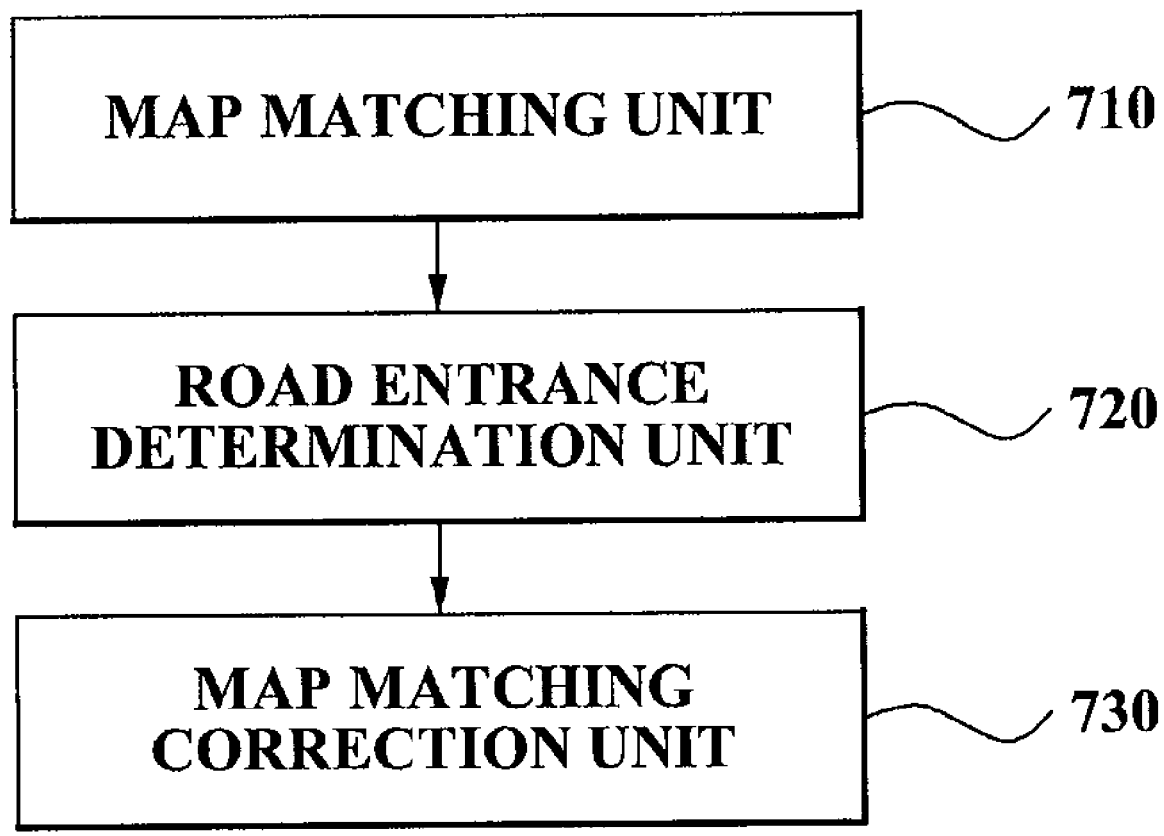
FIG. 7 is a block diagram illustrating a navigation system according to another exemplary embodiment of the present disclosure.

FIG. 7 is a block diagram illustrating a navigation system according to another exemplary embodiment of the present disclosure.

Referring to FIG. 7, the navigation system according to the present exemplary embodiment of the present disclosure may include a map matching unit 710, a road entrance determination unit 720, and a map matching correction unit 730.

The map matching unit 710 may perform a map matching of current vehicle location information with map information by using GPS information and the map information. Specifically, the map matching unit 710 may interoperate the GPS information and the map information, and correct a vehicle location on the map information when distance information and direction information of actually driving the vehicle are different from an image shown on the map information.

The road entrance determination unit 720 may check whether the vehicle leaves a route. When it is checked that the vehicle leaves the route, the road entrance determination unit 720 may interoperate with the map matching, and determine whether the vehicle enters an uphill/downhill road by using an acceleration sensor.

Specifically, the road entrance determination unit 720 may check whether the vehicle leaves the route and enters another route disregarding the driving route currently provided by the navigation system. When the vehicle leaves the route and enters the other route, the road entrance determination unit 720 may determine whether the vehicle goes up through the overpass, the entrance ramp, and the like, or goes down through the underpass, the exit ramp, and the like by using an acceleration sensor.

In this instance, the road entrance determination unit 720 may measure an inclination of the vehicle by using the acceleration sensor, and determine whether the vehicle enters the uphill/downhill road based on the measured inclination. Specifically, the road entrance determination unit 720 may determine that the vehicle enters the uphill road when the measured inclination indicates that the vehicle is inclined to a back side. Conversely, the navigation system may determine that the vehicle enters the downhill road when the measured inclination indicates that the vehicle is inclined to a front side.

The map matching correction unit 730 may perform a map matching correction by using the determination of whether the vehicle enters the uphill/downhill road and GPS information. Specifically, the map matching correction unit 730 may recognize current location information of the vehicle by using the GPS information when the vehicle enters the uphill/downhill road, and perform the map matching correction by using the recognized location information.

For example, a vehicle driver may drive the vehicle to the entrance ramp being an entrance road to an express highway at an express highway interchange disregarding a straight road, that is, a national highway provided by the navigation system. Specifically, the vehicle driver may drive the vehicle leaving an original route. In this case, the map matching correction unit 730 may re-search route information of the vehicle by using the determination of whether the vehicle enters the uphill/downhill road and the GPS information, and perform the map matching correction so that the vehicle realized in the navigation system may enter the entrance ramp according to the re-searched route information.

Figure 8:
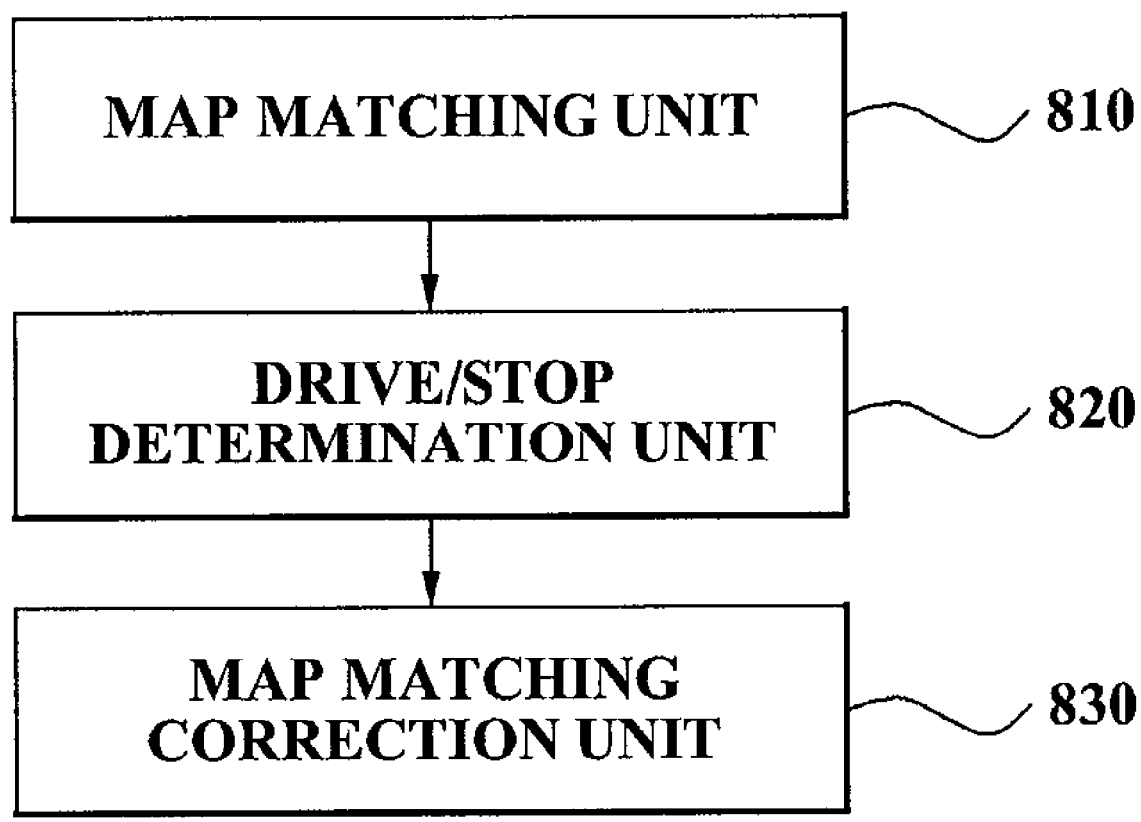
FIG. 8 is a block diagram illustrating a navigation system according to still another exemplary embodiment of the present disclosure.

FIG. 8 is a block diagram illustrating a navigation system according to still another exemplary embodiment of the present disclosure.

The navigation system according to the present exemplary embodiment of the present disclosure may include a map matching unit 810, a drive/stop determination unit 820, and a map matching correction unit 830.

The map matching unit 810 may perform a map matching of current vehicle location information with map information by using GPS information and the map information. Specifically, the map matching unit 810 may interoperate the GPS information and the map information, and correct a vehicle location on the map information when distance information and direction information of actually driving the vehicle are different from an image shown on the map information.

The drive/stop determination unit 820 may check whether GPS information can be received by the vehicle. When it is checked that the GPS information cannot be received, the drive/stop determination unit 820 may interoperate with the map matching, and determine whether the vehicle is driven/stopped by using an acceleration sensor. Specifically, the drive/stop determination unit 820 may determine whether the vehicle is driven/stopped by using an output value of the acceleration sensor in the area where the GPS information cannot be received, such as tunnel, and the like.

In this instance, the drive/stop determination unit 820 may measure speed information of the vehicle by using the acceleration sensor, and determine whether the vehicle is driven/stopped based on the measured speed information. For example, when the measured speed information is 0, the drive/stop determination unit 820 may determine that the vehicle is stopped. Conversely, when the measured speed information is different from 0, the drive/stop determination unit 820 may determine that the vehicle is driven.

The map matching correction unit 830 may perform a map matching correction by using the determination of whether the vehicle is driven/stopped. Specifically, the map matching correction unit 830 may perform the map matching correction by using the speed information of the vehicle until the GPS information can be received by the vehicle when the vehicle is driven/stopped.

For example, when the vehicle enters the tunnel, the map matching correction unit 830 may measure speed information of the vehicle at a point in time of entering the tunnel. The map matching correction unit 830 may store the measured speed information in a storage device. In this instance, the navigation system may have the storage device built-in. Next, the map matching correction unit 830 may perform the map matching correction by applying the measured speed information in the area where the GPS information cannot be received such as tunnel and the like.

In this instance, when the vehicle is momentarily stopped, the map matching correction unit 830 may maintain a state of applying speed information as '0' to the vehicle of the navigation system and of stopping the vehicle. When the vehicle is subsequently driven again, the map matching correction unit 830 may perform the map matching correction by extracting the speed information of the vehicle from the storage device and applying the extracted speed information to the vehicle of the navigation system.

Accordingly, the map matching correction unit 830 may accurately perform the map matching correction by using the acceleration sensor in the area where the GPS information cannot be received, such as tunnel, and the like, thereby minimizing a map matching error in the area where the GPS information cannot be received.

Also, although the vehicle is actually stopped in an area where there are many high-rise buildings or under an overpass, it may be shown that the vehicle of the navigation system is driven. Since the map matching correction unit 830 may determine whether the vehicle is stopped by using the acceleration sensor in the above-described area, that is, in the area where there are many high-rise buildings or under the overpass, a malfunction of the navigation system due to a reflected wave by buildings and the like, that is, a multipath, may be prevented.

According to the above-described exemplary embodiments of the present disclosure, a method of correcting a map matching and a navigation system for implementing the method may minimize an error between GPS information of a vehicle and map information by using an acceleration sensor, thereby quickly and accurately performing the map matching.

Also, according to the above-described exemplary embodiments of the present disclosure, a method of correcting a map matching and a navigation system for implementing the method may quickly and accurately perform the map matching in various driving environments by using an acceleration sensor.

Although a few embodiments of the present disclosure have been shown and described, the present disclosure is not limited to the described embodiments. Instead, it would be appreciated by those skilled in the art that changes may be made to these embodiments without departing from the principles and spirit of the present disclosure, the scope of which is defined by the claims and their equivalents.

The invention claimed is:

1. A navigation system comprising:
   a turn determination unit determining that the vehicle turns right when the measured inclination indicates that the vehicle is inclined to a left-hand side by using an acceleration sensor, or
   determining that the vehicle turns left when the measured inclination indicates that the vehicle is inclined to a right-hand side by using the acceleration sensor; and
   a map matching correction unit performing a map matching correction by using the determination of whether the vehicle turns and GPS information.

2. The navigation system of claim 1, wherein the turn determination unit determines whether a GPS angle realized on a screen of a navigation system shows a left/right rotation form, and determines that a lane of the vehicle is changed when it is determined that the GPS angle shows the left/right rotation form.

3. The navigation system of claim 1, wherein the map matching correction unit recognizes current location information of the vehicle by using the GPS information when the vehicle turns, and performs the map matching correction by using the recognized location information.

4. A navigation system comprising:
   a road entrance determination unit checking whether a vehicle leaves a route, and determining whether the vehicle enters an uphill/downhill road by using an acceleration sensor when the vehicle leaves the route; and
   a map matching correction unit performing a map matching correction by using the determination of whether the vehicle enters the uphill/downhill road and GPS information.

5. The navigation system of claim 4, wherein the road entrance determination unit measures an inclination of the vehicle by using the acceleration sensor, and determines whether the vehicle enters the uphill/downhill road based on the measured inclination.

6. The navigation system of claim 5, wherein the road entrance determination unit determines that the vehicle enters the uphill road when the measured inclination indicates that the vehicle is inclined to a back side, or determines that the vehicle enters the downhill road when the measured inclination indicates that the vehicle is inclined to a front side.

7. The navigation system of claim 4, wherein the map matching correction unit recognizes current location information of the vehicle by using the GPS information when the vehicle enters the uphill/downhill road, and performs the map matching correction by using the recognized location information.

8. A navigation system comprising:
   a drive/stop determination unit determining whether a vehicle is driven/stopped by using an acceleration sensor when the vehicle is in an area where a malfunction of the navigation system happens due to a reflected wave; and
   a map matching correction unit performing a map matching correction by using the determination of whether the vehicle is driven/stopped.

9. The navigation system of claim 8, wherein the drive/stop determination unit measures speed information of the vehicle by using the acceleration sensor, and determines whether the vehicle is driven/stopped based on the measured speed information.

10. The navigation system of claim 9, wherein the map matching correction unit performs the map matching correction by using the speed information until the GPS information can be received when the vehicle is driven/stopped.

* * * * *